July 13, 1954     I. R. AXELRAD     2,683,875
METHOD OF PROVIDING METALLIC SEGMENTS
ON ELASTOMER MEMBERS
Filed Dec. 8, 1950

WITNESSES:
E.A. M?Closkey
K.W. Thomas

INVENTOR
Irving R. Axelrad.
BY Frederick Shapoe
ATTORNEY

Patented July 13, 1954

2,683,875

UNITED STATES PATENT OFFICE 2,683,875

METHOD OF PROVIDING METALLIC SEGMENTS ON ELASTOMER MEMBERS

Irving R. Axelrad, Pittsburgh, Pa., assignor to Westinghouse Electric Corporation, East Pittsburgh, Pa., a corporation of Pennsylvania Application December 8, 1950, Serial No. 199,808

2 Claims. (Cl. 29—149.5)

This invention relates to the method of providing metallic segments on an elastomer member, and in particular, to the formation of such devices under heat and pressure.

In power circuit breakers, it is customary to mount a main contact member on a movable switch arm which is disposed for movement relative to a fixed main contact member. When the circuit controlled by the circuit breaker is closed, the contact members are in engagement, and when the circuit is to be interrupted, the switch arm with its associated contact member is moved rapidly to separate the contact members. Due to the high-speed of the switch arm immediately following such separation of the contact members, it is desirable that means be provided for absorbing the shock of the switch arm and the moving parts connected thereto at the end of the opening operation to prevent damage to the parts.

Another object of this invention is a method for providing a plurality of brake shoes vulcanized to an expansible elastomer plunger and conforming to the shape of a complementary braking member.

Other objects of this invention will become apparent from the following description when taken in conjunction with the accompanying drawing, in which.

Figure 1:
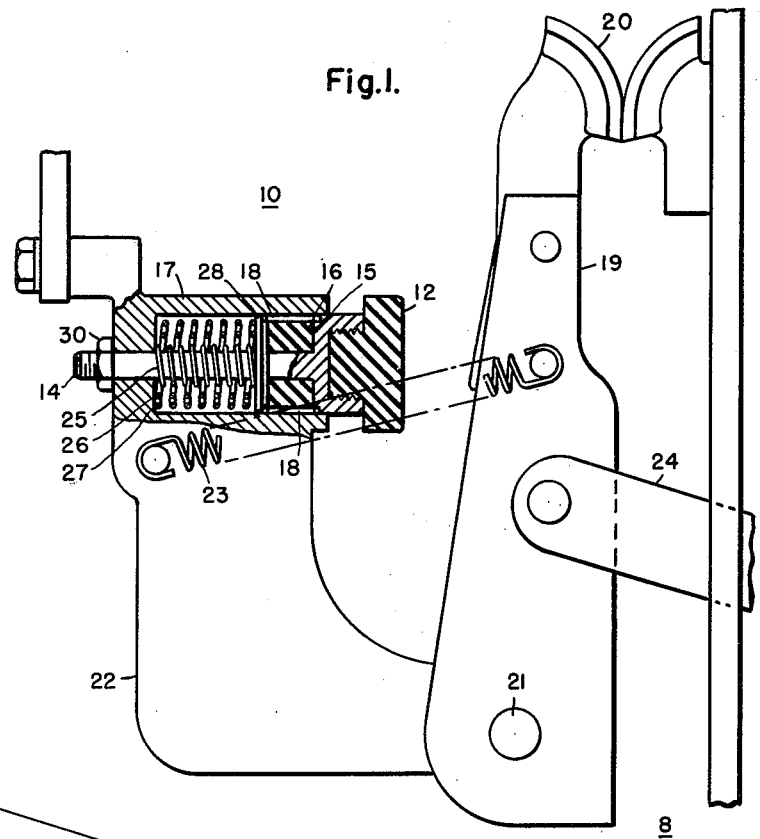
Figure 1 is an elevation view partly in section of the shock absorber embodying a teaching of this invention and a portion of the circuit breaker embodying the same.

Referring to Fig. 1 of the drawing, there is illustrated a portion of a circuit breaker 8 embodying a shock absorber shown generally at 10. The shock absorber 10 comprises a bumper element 12 which is preferably made from a hard rubber or its equivalent. The bumper element 12 is fastened into the end of a bolt 14, the end of which bolt has been enlarged to form a shoulder 15. A vulcanized elastomer tube or plunger 16 whose circumferential surface is surrounded by a plurality of brake shoes 18 bonded thereto, makes contact with the shoulder 15 and is disposed in a cylindrical chamber 17, it being understood that the elastomer member 16 and the chamber 17 may be any desirable shape, such as hexagonal, their shape not being limited to cylindrical. The diameter of the shoulder 15 is less than the diameter of the hollow cylindrical chamber 17 yet greater than the inside diameter of the assembled brake shoes 18, so that the shoulder 15 will completely cover the end of the elastomer tube 16, thus preventing the longitudinal distortion of the elastomer tube 16. A switch arm 19 carrying a movable contact member 20 is pivotally mounted on a pin 21 which is supported in a frame 22. The circuit breaker 8 is adapted to be opened at high speeds by means of a strong tension spring 23. The switch arm 19 is connected by means of a link 24 to a suitable operating mechanism (not shown) for actuating the movable contact 20 to the circuit closing position. When the movable contact 20 is actuated to the circuit interrupting position by means of the spring 23, the switch arm 19 strikes the bumper member 12, the shock absorber 10 absorbing the kinetic energy of the switch arm 19.

In order to bias the bumper element 12 in the direction of the switch arm 19, helical spring members 25, 26 and 27 are provided in the chamber 17, it being understood that one or more springs having sufficient strength to give the desired braking action could be utilized. These helical spring members 25, 26 and 27 bear against a washer 28 which is disposed for engagement with the end of the elastomer tube 16 opposite to the end in contact with shoulder 15. The washer 28 has a diameter less than the diameter of the hollow cylindrical chamber 17, yet greater than the inside diameter of the assembled brake shoes 18, so that the washer completely covers the end of the elastomer tube 16, thus preventing the longitudinal distortion of elastomer tube 16. A nut 30 is provided so that the shock absorber 10 may be adjusted to various degrees of flexibility.

Figure 2:
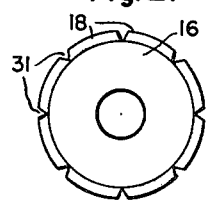
Fig. 2 is a plan view of the brake shoes and their supporting member which comprise a part of the shock absorber embodying a teaching of this invention.
Figure 3:
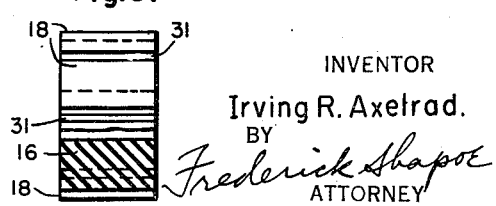
Fig. 3 is an elevation view of the brake shoes shown in Fig. 2 and their supporting member.

Referring to Figs. 2 and 3 of the drawing, the brake shoes 18 are shown assembled around the circumferential surface of the elastomer tube 16. As can be seen from the drawing, the brake shoes 18 substantially completely surround the circumferential surface of the elastomer tube 16, there being a notch 31 between adjacent shoes. In practice it has been found desirable to manufacture the brake shoes 18 from steel, however, any other suitable metal such as brass can be utilized.

Figure 4:
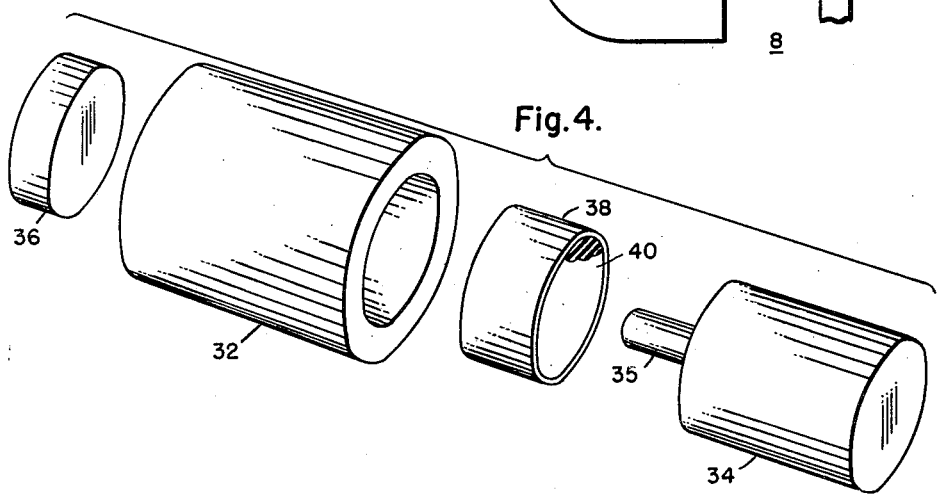
Fig. 4 is an exploded view in perspective depicting apparatus for manufacturing the brake shoes and their supporting member.

Referring to Fig. 4 of the drawing, there is illustrated apparatus for manufacturing by a molding operation the elastomer tube 16 and its associated brake shoes 18. The apparatus comprises a mold 32, a male die member 34 having a protruding cylindrical member 35, and a metal insert 36.

Preliminary to the molding operation in the manufacture of the brake shoes 18 and their supporting member, the elastomer tube 16, the inner surface of a steel tube member 38 is thoroughly cleaned. In practice, a cleansing solution of 20% sulfuric acid has been found satisfactory. The steel tube 38 is immersed in this solution for three minutes at a temperature of 60° C. The tube 38 is then rinsed several times in fresh water. Once the rinsing operation has been completed, the tube 38 is blown dry with compressed air. However, other suitable cleaning and drying methods may be employed.

Thereafter a bonding agent and in particular an elastomer cement containing a suitable accelerator is applied to the inside surface of the steel tube 38. In practice, it has been found desirable to allow the cement to dry approximately 30 minutes at room temperature to remove any solvent that is present. The solvent having been removed, a cylindrical unvulcanized elastomer member 40 having a length approximately equal to the length of the tube 38 and a diameter that is slightly less than its inner diameter is placed within the steel tube 38 in such a manner as not to disturb the cement coating on the inner wall. Any suitable vulcanizable elastomer such as polychloroprene, butadiene copolymerized with acrylonitrile (Buna-N), butadiene-styrene copolymer (Buna-S), natural rubber, organic polysulfide rubbers, and silastic rubber may be used for the member 40.

In the molding operation the metal insert 36 is positioned in one end of the mold 32 and the prepared steel tube 38, along with the cylindrical unvulcanized elastomer member 40 is positioned in the mold against the metal insert 36. The die member 34 is lowered into the mold 32 with the protruding cylindrical member 35 displacing the elastomer member 40, thereby forcing the elastomer against the inner wall of the steel tube 38 and applying pressure thereto. Heat is applied to the elastomer member 40 and the steel tube 38 while so compressed. Temperatures of between 125° C. and 200° C. may be used depending upon the vulcanization characteristics of the particular elastomer utilized in making the tube 16. And again depending upon the elastomer used, a pressure of between 1,000 and 3,000 pounds per square inch is applied to the elastomer member 40. In practice when using polychloroprene for the member 40, it has been found satisfactory to maintain a pressure of 1,500 pounds per square inch and a temperature of 160° C. for a period of 20 minutes to vulcanize the polychloroprene and bond it to the tube 38.

The above-described molding process causes the elastomer member 40 to vulcanize to a relatively hard, flexible tubular shape which is bonded to the walls of the steel tube 38. When polychloroprene is processed at the above-mentioned temperature and pressure, a Shore A durometer hardness of between 40 and 60 is obtained.

In order to form the brake shoes 18 after the cylindrical elastomer member 40 has been molded in the steel tube 38, the tube 38 is placed in a milling machine and the grooves 31, as shown in Figs. 2 and 3, are cut therein. In practice, a 30° groove is milled in the steel tube 38 to a depth almost equal to the thickness of the tube 38. A thickness of not over 0.005 inch of metal should be left at the bottom of the groove, so that on flexing the brake shoes 18 whatever metal that is left at the bottom of the groove 31 in the form of a burr will be broken, thus forming a plurality of separate brake shoes 18.

However, it is to be understood that any suitable groove shape may be cut in the tube 38 by any suitable means provided the circumferential surface of the elastomer tube 16 is substantially completely covered by the metal forming the brake shoes 18 and that the brake shoes 18 formed thereby can be moved radially outward from the center of the elastomer tube 16. Unless the brake shoes 18 substantially completely cover the circumferential surface of the elastomer tube 16, the elastomer being elastic will creep out through the uncovered space between the brake shoes 18, thus rendering the shock absorber less effective.

In operation of the circuit breaker 8 as shown in Fig. 1, when a fault occurs on the line or for any other reason, the movable contact member 20 is actuated by means of the tension spring 23 to the circuit interrupting position, the switch arm 19 strikes the bumper element 12, and the shoulder 15 exerts a pressure on the elastomer tube 16 whose movement is checked by the washer 28 and the springs 25, 26 and 27, and the elastomer tube 16 is displaced radially and forces the steel brake shoes 18 against the wall of the cylindrical chamber 17. The pressure exerted by the brake shoes 18 against the wall effects a braking action which, along with the biasing action of the springs 25, 26 and 27, checks the rapid inward movement of the bumper element 12. This action limits the movement of the switch arm 19 and serves to cushion it.

When the switch arm 19 is actuated by the operating mechanism so as to return the movable contact member 20 to the circuit closing position, the shock absorber 10 will likewise return to its position as shown in the drawing.

The shock absorber 10 embodying a teaching of this invention has several advantages. Among these advantages is the low cost of manufacture. Not only is its original cost of manufacture low, but the cost of assembling the shock absorber on a circuit breaker is likewise low.

It will be apparent to those skilled in the art that modifications in the structure shown and described may be made within the spirit of my invention, and I do not wish to be limited otherwise than by the scope of the appended claims.

I claim as my invention:

1. The method comprising the steps of, applying cement to the cleaned inner surface of a metallic tube, inserting a cylindrical elastomer member in the metallic tube, so molding the assembly under heat and pressure that the elastomer member is forced against and securely bonded to the inner surface of the metallic tube, is provided with a hole, and the elastomer member is vulcanized, the molding operation taking place at a temperature of between 125 and 200 degrees centigrade and a pressure of between 1,000 and 3,000 pounds per square inch so as to vulcanize the cylindrical elastomer member, milling a plurality of evenly spaced V-shaped longitudinal slots in the metallic tube so as to form a plurality of metallic segments held together by only a thin layer of metal and which substantially completely surround the circumferential surface of the elastomer member, and moving the metallic segments relative to one another to effect a complete separation.

2. The method comprising the steps of, inserting a cylindrical elastomer member in a metallic tube, so molding the assembly under heat and pressure that the elastomer member is forced against and securely bonded to the inner surface of the metallic tube, and the elastomer is vulcanized, the molding operation taking place at a temperature of between 125 and 200 degrees centigrade and a pressure of between 1,000 and 3,000 pounds per square inch so as to vulcanize the cylindrical elastomer member, cutting a plurality of spaced longitudinal slots in the metallic tube so as to form a plurality of metallic segments held together by only a thin layer of metal and which substantially completely surround the circumferential surface of the elastomer member, and moving the metallic segments relative to one another to effect a complete separation.

References Cited in the file of this patent

UNITED STATES PATENTS

| Number | Name | Date |
|---|---|---|
| 239,111 | O'Meara | Mar. 22, 1881 |
| 2,126,733 | Catt | Aug. 16, 1938 |
| 2,134,179 | Evans | Oct. 25, 1938 |
| 2,134,749 | Burt | Nov. 1, 1938 |
| 2,137,000 | Deans | Nov. 15, 1938 |
| 2,153,035 | Burt | Apr. 4, 1939 |
| 2,181,136 | Knox | Nov. 28, 1939 |
| 2,324,083 | Holmes | July 13, 1943 |
| 2,360,528 | Talmage | Oct. 17, 1944 |
| 2,371,399 | Mantle | Mar. 13, 1945 |
| 2,397,626 | Shriver | Apr. 2, 1946 |
| 2,554,008 | Burger | May 22, 1951 |